(12) United States Patent
Takahashi (10) Patent No.: US 12,017,700 B2
(45) Date of Patent: Jun. 25, 2024

(54) CONTROL DEVICE FOR LANE DEPARTURE PREVENTION DEVICE

(71) Applicant: ISUZU MOTORS LIMITED, Tokyo (JP)

(72) Inventor: Tatsuo Takahashi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 203 days.

(21) Appl. No.: 17/793,874

(22) PCT Filed: Jan. 13, 2021

(86) PCT No.: PCT/JP2021/000762
§ 371 (c)(1),
(2) Date: Jul. 19, 2022

(87) PCT Pub. No.: WO2021/149543
PCT Pub. Date: Jul. 29, 2021

(65) Prior Publication Data
US 2023/0059106 A1 Feb. 23, 2023

(30) Foreign Application Priority Data
Jan. 20, 2020 (JP) .................... 2020-007127

(51) Int. Cl.
*B62D 15/00* (2006.01)
*B62D 15/02* (2006.01)
*G08G 1/16* (2006.01)

(52) U.S. Cl.
CPC ............. *B62D 15/025* (2013.01); *G08G 1/16* (2013.01)

(58) Field of Classification Search
CPC ................................ B62D 15/025; G08G 1/16
See application file for complete search history.

(56) References Cited

U.S. PATENT DOCUMENTS 10,839,692 B2 * 11/2020 Kawaguchi ......... B60W 30/095
2012/0109462 A1 5/2012 Hong
(Continued)

FOREIGN PATENT DOCUMENTS

| JP | 2006-347508 A | 12/2006 |
| JP | 2010-030386 A | 2/2010 |

(Continued)

OTHER PUBLICATIONS

Patent Cooperation Treaty, International Search Report, Application No. PCT/JP2021/000762, dated Feb. 17, 2021, in 5 pages.
(Continued)

*Primary Examiner* — Jacob M Amick
(74) *Attorney, Agent, or Firm* — PROCOPIO, CORY, HARGREAVES & SAVITCH LLP (57) ABSTRACT

A control device includes a lane departure detection unit that detects lane departure of a vehicle, a rear vehicle determination unit that determines whether a rear vehicle is present on a rear side, a lane change start detection unit that detects start of a lane change, a lane change end detection unit that detects end of the lane change, a steering assistance control unit that applies an assistive steering torque to a steering wheel, and an assistive steering torque cancellation unit that, in a case where the start of the lane change is detected and no rear vehicle is present, cancels application of the assistive steering torque, and in a case where the end of the lane change is detected and a rear vehicle is present, cancel the application of the assistive steering torque.

5 Claims, 4 Drawing Sheets (56) References Cited

U.S. PATENT DOCUMENTS

| | | | |
|---|---|---|---|
| 2017/0240172 A1 | 8/2017 | Nishiguchi et al. | |
| 2018/0046191 A1* | 2/2018 | Keller | B60W 50/10 |
| 2019/0329778 A1* | 10/2019 | D'sa | B62D 15/0255 |
| 2020/0269839 A1* | 8/2020 | Sato | B60W 30/18163 |

FOREIGN PATENT DOCUMENTS

| | | |
|---|---|---|
| JP | 2010-030424 A | 2/2010 |
| JP | 2017-146817 A | 8/2017 |

OTHER PUBLICATIONS

Patent Cooperation Treaty, WOSA, Application No. PCT/JP2021/000762, dated Feb. 17, 2021, in 3 pages.

\* cited by examiner

CONTROL DEVICE FOR LANE DEPARTURE PREVENTION DEVICE

CROSS-REFERENCE TO RELATED APPLICATIONS

This application is US National Stage of International Patent Application PCT/JP2021/000762, filed Jan. 13, 2021, which claims benefit of priority from Japanese Patent Application JP2020-007127, filed Jan. 20, 2020, the contents of both of which are incorporated herein by reference.

TECHNICAL FIELD

The present disclosure relates to a control device for a lane departure prevention device.

BACKGROUND ART

In this type of lane departure prevention device, in a case where a vehicle is about to depart from a lane, lane departure prevention is achieved by applying an assistive steering torque to a steering wheel in a direction opposite from a departure direction of the vehicle. Such an assistive steering torque can be canceled by the driver performing a steering operation having a steering torque larger than a preset override threshold value.

As an example of a lane departure prevention device, for example, Patent Literature 1 discloses a technique of making an override threshold value variable in accordance with the presence or absence of a rear vehicle traveling in an adjacent lane.

CITATION LIST

Patent Literature

Patent Literature 1: JP-A-2017-146817

SUMMARY OF INVENTION

Technical Problem

In the lane departure prevention device described above, in order to enhance effectiveness of lane departure prevention, it is preferable to continuously apply an assistive steering torque in a direction opposite from the departure direction of the vehicle over a predetermined period from the lane departure. However, in a case where the assistive steering torque in the opposite direction is continuously applied even after a lane change of the vehicle, it is against the driver's intention to maintain the changed lane. That is, the driver is forced to perform a steering operation that overcomes the assistive steering torque for a predetermined period, which is troublesome.

In order to easily cancel such an assistive steering torque, it is conceivable to set the override threshold value to be low. However, in a case where the override threshold value is lowered, there is a problem that safety cannot be secured by increasing the possibility of a collision in a case where a rear vehicle is present.

The present disclosure has been made in view of the above circumstances, and an object of the present disclosure is to provide a control device for a lane departure prevention device capable of effectively reflecting a driver's intension while effectively reducing a risk of collision.

Solution to Problem

A technique of the present disclosure includes: a lane departure detection unit configured to detect lane departure of a vehicle from a traveling lane; a rear vehicle determination unit configured to determine whether a rear vehicle is present on a rear side of the vehicle; a lane change start detection unit configured to detect start of a lane change of the vehicle from the traveling lane; a lane change end detection unit configured to detect end of the lane change of the vehicle from the traveling lane; a steering assistance control unit configured to, in a case where the lane departure is detected, apply an assistive steering torque to a steering wheel for a predetermined period in a direction opposite from a lane departure direction so that the vehicle maintains the traveling lane; and an assistive steering torque cancellation unit configured to, in a case where the lane change start detection unit detects the start of the lane change in a case where the rear vehicle determination unit determines that no rear vehicle is present, cancel application of the assistive steering torque, and in a case where the lane change end detection unit detects the end of the lane change in a case where the rear vehicle determination unit determines that a rear vehicle is present, cancel the application of the assistive steering torque.

Preferably, the assistive steering torque cancellation unit cancels the application of the assistive steering torque in a case where elapsed time from the start of the application of the assistive steering torque reaches a predetermined upper limit threshold time.

Preferably, the assistive steering torque cancellation unit cancels the application of the assistive steering torque in a case where a torque of an steering operation by a driver exceeds a predetermined first torque threshold value in the case where the rear vehicle determination unit determines that no rear vehicle is present, and cancels the application of the assistive steering torque in a case where the torque of the steering operation by the driver exceeds a predetermined second torque threshold value larger than the first torque threshold value in a case where the rear vehicle determination unit determines that a rear vehicle is present.

Advantageous Effects of Invention

According to the technology of the present disclosure, it is possible to effectively reflect a driver's intension while effectively reducing the risk of collision.

DESCRIPTION OF EMBODIMENTS

Hereinafter, a control device for a lane departure prevention device according to the present embodiment will be described with reference to the accompanying drawings. The same components are denoted by the same reference numerals, and the names and functions thereof are also the same. Therefore, detailed descriptions of the same components are not repeated.

Figure 1:
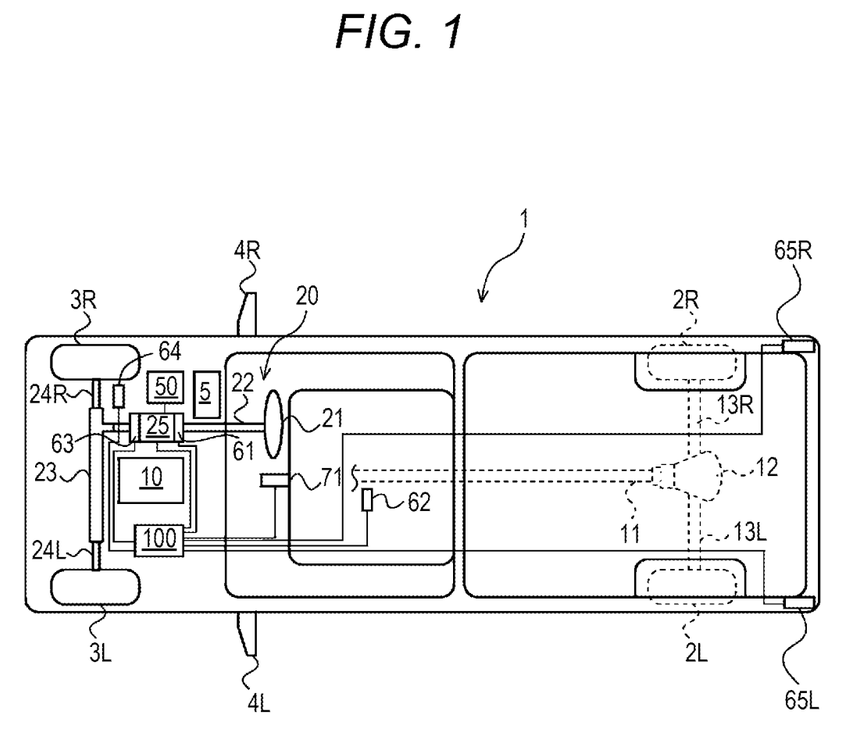
FIG. 1 is an overall configuration diagram schematically illustrating a vehicle on which a control device for a lane departure prevention device according to the present embodiment is mounted.

FIG. 1 is an overall configuration diagram schematically illustrating a vehicle 1 on which a control device 100 for a lane departure prevention device according to the present embodiment is mounted.

An engine 10 as an example of a driving force source is mounted on the vehicle 1. Drive wheels 2L and 2R are connected to the engine 10 via a clutch device (not illustrated), a transmission (not illustrated), a propeller shaft 11, a differential gear device 12, left and right drive shafts 13L and 13R, and the like. The vehicle 1 is not limited to a rear-wheel drive vehicle, and may be a front-wheel drive vehicle or a four-wheel drive vehicle. In addition, the driving force source is not limited to the engine, and may be a traveling motor or a hybrid vehicle using these in combination.

The vehicle 1 is provided with a steering device 20. The steering device 20 includes a steering wheel 21 operated by a driver, a steering shaft 22 having one end coupled to the steering wheel 21, a rack and pinion (or power cylinder) mechanism 23 coupled to the other end of the steering shaft 22, and left and right link mechanisms 24L and 24R coupling the rack and pinion mechanism 23 and left and right steered wheels 3L and 3R.

The steering device 20 is provided with a steering motor 25. The steering motor 25 is provided on the steering shaft 22, and applies a steering torque to the steering shaft 22 by being driven. The steering motor 25 is not limited to a column assist type in the illustrated example, and may be a pinion assist type or a rack assist type that transmits a torque to the rack and pinion mechanism 23. The steering motor 25 is driven by electric power supplied from a battery 50. The driving of the steering motor 25 is controlled in accordance with a command from the control device 100.

The vehicle 1 is provided with a meter display unit 5. The meter display unit 5 displays various information on the vehicle 1, for example, a vehicle speed. In addition, the meter display unit 5 displays a warning in a steering assistance control to be described later. The vehicle 1 is provided with left and right door mirrors 4L and 4R. The door mirrors 4L and 4R display a warning in the steering assistance control.

A steering angle sensor 61 is provided on the steering shaft 22 and detects a steering angle corresponding to a rotation amount of the steering shaft 22. A vehicle speed sensor 62 detects the current vehicle speed of the vehicle 1 from a propeller shaft or the like. The vehicle speed sensor 62 may be a wheel speed sensor. A torque sensor 63 is provided on the steering shaft 22, and detects a steering torque corresponding to steering of the steering wheel 21. An accelerator pedal sensor 64 detects a press-down amount of an accelerator pedal (not illustrated). Sensor values of the sensors 61 to 64 are transmitted to the control device 100.

A left rear side millimeter wave radar 65L acquires a distance and a relative speed between the vehicle 1 and a vehicle on a left rear side. A right rear side millimeter wave radar 65R acquires a distance and a relative speed between the vehicle 1 and a vehicle on a right rear side. The distance and the relative speed with respect to the vehicle on the rear side acquired by the rear side millimeter wave radars 65L and 65R are transmitted to the control device 100.

A front camera 71 is, for example, a stereo camera, captures an image of a front lane of the vehicle 1, and generates image data of the front lane. The front camera 71 may be a monocular camera. The image data generated by the front camera 71 is transmitted to the control device 100.

Figure 2:
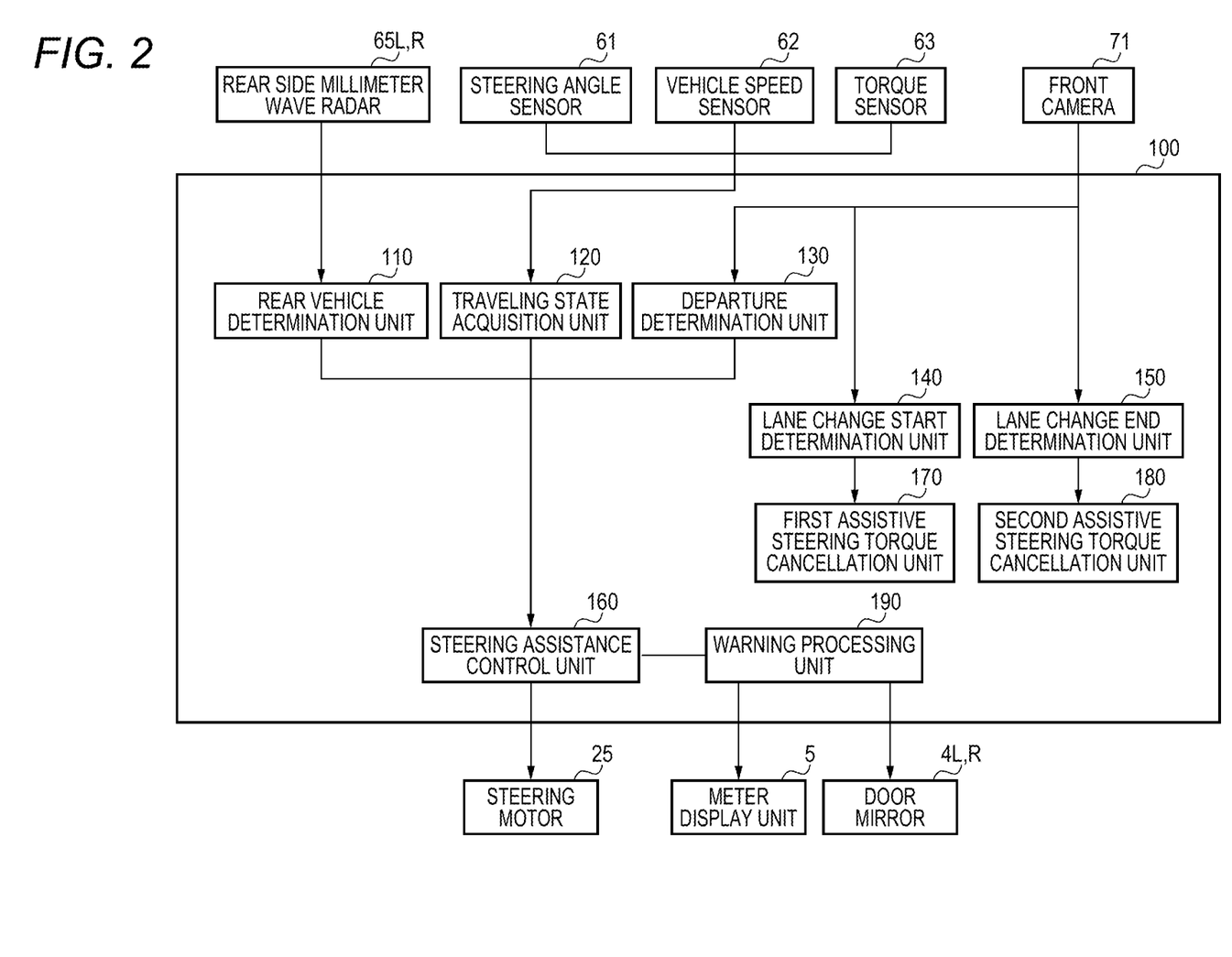
FIG. 2 is a schematic functional block diagram illustrating the control device according to the present embodiment and a related peripheral configuration.

FIG. 2 is a schematic functional block diagram illustrating the control device 100 according to the present embodiment and a related peripheral configuration.

The control device 100 is, for example, a device that performs computation such as a computer, includes a central processing unit (CPU), a read only memory (ROM), a random access memory (RAM), an input port, an output port, and the like that are connected to each other via a bus or the like, and executes a control program. In addition, the control device 100 functions as a device including a rear vehicle determination unit 110, a traveling state acquisition unit 120, a departure determination unit 130, a lane change start determination unit 140, a lane change end determination unit 150, a steering assistance control unit 160, a first assistive steering torque cancellation unit 170, a second assistive steering torque cancellation unit 180, and a warning processing unit 190 by executing the control program.

The rear vehicle determination unit 110 determines whether a vehicle is present on the rear side of the vehicle 1 based on the distance and the relative speed with respect to the vehicle on the rear side transmitted from each of the rear side millimeter wave radars 65L and 65R. A determination result of the rear vehicle determination unit 110 is transmitted to the steering assistance control unit 160.

The traveling state acquisition unit 120 acquires a traveling state of the vehicle 1 from the steering angle transmitted from the steering angle sensor 61, the vehicle speed transmitted from the vehicle speed sensor 62, the steering torque transmitted from the torque sensor 63, and the like. The traveling state acquired by the traveling state acquisition unit 120 is transmitted to the steering assistance control unit 160.

The departure determination unit 130 (an example of a lane departure detection unit according to the present disclosure) detemlines whether the vehicle 1 departs from a traveling lane. Specifically, the departure deteimination unit 130 performs image recognition processing on the image data transmitted from the front camera 71 to detect a boundary line (a white line or a yellow line) defining a lane. Then, in a case where a distance from the vehicle 1 to the boundary line becomes less than a predetermined first distance threshold value, the departure determination unit 130 determines that the vehicle 1 departs from the traveling lane. A determination result of the departure determination unit 130 is transmitted to the steering assistance control unit 160.

The lane change start determination unit 140 (an example of a lane change start detection unit according to the present disclosure) determines whether the vehicle 1 starts a lane change. Specifically, the lane change start determination unit 140 performs image recognition processing on the image data transmitted from the front camera 71 to detect a boundary line (a white line or a yellow line) defining a lane. For example, in a case where a driver's lane change intention is detected based on the steering torque transmitted from the traveling state acquisition unit 120, an operation of a direction indicator (not illustrated), or the like, the lane change start determination unit 140 determines that the vehicle 1 starts the lane change in a case where the vehicle 1 reaches the boundary line. A determination result of the lane change start determination unit 140 is transmitted to the lane change end determination unit 150 and the first assistive steering torque cancellation unit 170.

The lane change end determination unit 150 (an example of a lane change end detection unit according to the present disclosure) determines whether the vehicle 1 ends the lane change. Specifically, the lane change end determination unit 150 performs image recognition processing on the image data transmitted from the front camera 71 to detect a boundary line (a white line or a yellow line) that defines the lane in which the vehicle 1 is currently traveling. Then, in a case where the distance between the vehicle 1 and the boundary line reaches a predetermined second distance threshold value after the lane change start determination unit 140 determines that the lane change is started, the lane change end determination unit 150 determines that the vehicle 1 ends the lane change. A determination result of the lane change end determination unit 150 is transmitted to the second assistive steering torque cancellation unit 180.

In a case where the departure determination unit 130 determines that the vehicle 1 departs from the lane and the vehicle speed of the vehicle 1 transmitted from the traveling state acquisition unit 120 is in a predetermined speed range (for example, 60 km to 130 km per hour), the steering assistance control unit 160 performs the steering assistance control of applying an assistive steering torque for preventing lane departure of the vehicle 1 to the steering wheel 21.

Specifically, the steering assistance control unit 160 calculates a direction and a torque for preventing departure based on the traveling state transmitted from the traveling state acquisition unit 120, controls the driving of the steering motor 25 based on the direction and the torque, and performs the steering assistance control by applying an assistive steering torque to the steering wheel 21 in a direction opposite from the departure direction. The steering assistance control started by the steering assistance control unit 160 ends in a case where the departure determination unit 130 determines that the departure is canceled or in a case where the departure is canceled by the assistive steering torque cancellation units 170 and 180.

In a case where the rear vehicle determination unit 110 determines that no rear vehicle is present, in a case where the steering torque by the driver exceeds a predetermined first override threshold value (for example, 11 N (2 Nm)), the first assistive steering torque cancellation unit 170 immediately cancels application of the assistive steering torque by the steering assistance control. Accordingly, in a case where no rear vehicle is present, in other words, in a state where a possibility of collision with the rear vehicle is low, it is possible to effectively reflect the driver's intention to change lanes.

Even in a case where the steering torque of the driver is equal to or less than the first override threshold value, the first assistive steering torque cancellation unit 170 immediately cancels the application of the assistive steering torque by the steering assistance control in a case where any one of the following first cancellation conditions (1) and (2) is satisfied. (1) in a case where the lane change start determination unit 140 determines that the lane change is started during the execution of the steering assistance control (2) in a case where elapsed time from the start of the application of the assistive steering torque by the steering assistance control exceeds a predetermined upper limit threshold time (for example, 9 seconds)

As described above, in the case where no rear vehicle is present (the possibility of collision with the rear vehicle is low), in a case where start of the lane change of the vehicle 1 is detected, it is possible to effectively reflect the driver's lane change intention by immediately canceling the application of the assistive steering torque. In addition, in a case where the upper limit threshold time is reached, the application of the assistive steering torque is immediately canceled, and thus it is possible to effectively reduce the inconvenience caused by the steering assistance control being performed over a long period of time.

In a case where the rear vehicle determination unit 110 determines that a rear vehicle is present, in a case where the steering torque by the driver exceeds a second override threshold value (for example, 21 N (4 Nm)) that is larger than the first override threshold value, the second assistive steering torque cancellation unit 180 immediately cancels the application of the assistive steering torque by the steering assistance control. Accordingly, in the case where a rear vehicle is present, in other words, in a state in which the possibility of collision with the rear vehicle is high, it is possible to effectively reduce the possibility of collision with the rear vehicle.

Even in a case where the steering torque of the driver is equal to or less than the second override threshold value, the second assistive steering torque cancellation unit 180 immediately cancels the application of the assistive steering torque by the steering assistance control in a case where any one of the following second cancellation conditions (1) and (2) is satisfied. (1) in a case where the lane change end determination unit 150 determines that the lane change is ended during the execution of the steering assistance control (2) in a case where elapsed time from the start of the application of the assistive steering torque by the steering assistance control exceeds a predetermined upper limit threshold time (for example, 9 seconds)

As described above, in the case where a rear vehicle is present (the possibility of collision with the rear vehicle is high), the application of the assistive steering torque is enabled until the lane change of the vehicle 1 ends, and in a case where end of the lane change of the vehicle 1 is detected, the application of the assistive steering torque is immediately canceled, so that it is possible to effectively reflect the driver's lane change intention while preventing collision with the rear vehicle. In addition, in a case where the upper limit threshold time is reached, the application of the assistive steering torque is immediately canceled, and thus it is possible to effectively reduce the inconvenience caused by the steering assistance control being performed over a long period of time.

In the case where the rear vehicle determination unit 110 determines that no rear vehicle is present, in a case where the steering assistance control unit 160 starts the steering assistance control, the warning processing unit 190 performs an optical warning for displaying a warning of the lane departure on the meter display unit 5 for at least one second. In addition, in the case where the rear vehicle determination unit 110 determines that no rear vehicle is present, in a case where the steering assistance control unit 160 starts the steering assistance control, the warning processing unit 190 performs a vibration warning for vibrating the steering wheel 21 by the steering motor 25. Accordingly, it is possible to effectively notify the driver that the steering assistance control is being performed due to the lane departure of the vehicle 1.

Figure 3:
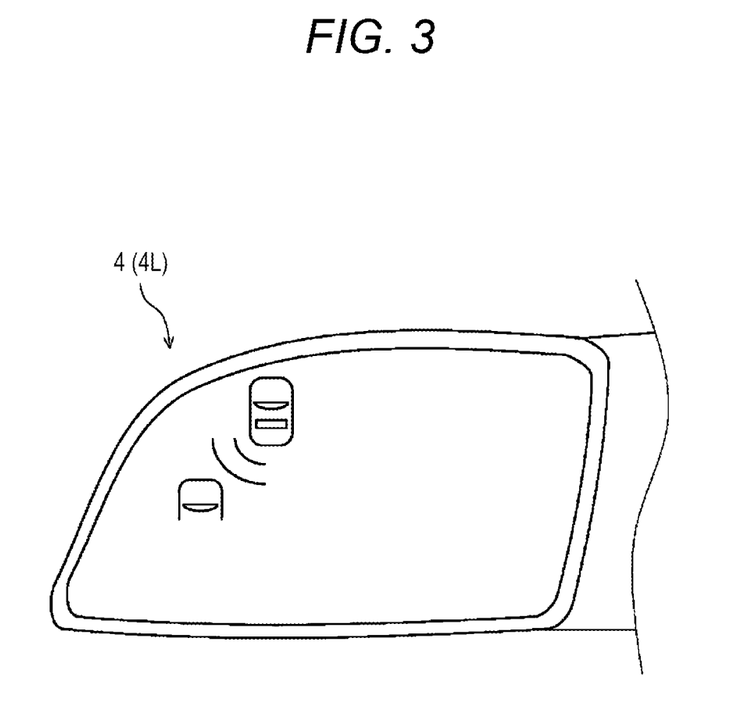
FIG. 3 is a diagram schematically illustrating an optical warning implemented in a steering assistance control according to the present embodiment.

In the case where the rear vehicle determination unit 110 determines that a rear vehicle is present, in a case where the steering assistance control unit 160 starts the steering assistance control, the warning processing unit 190 performs an optical warning that displays, in a blinking manner, a warning indicating that a rear vehicle is present on the door mirror 4 (for example, the door mirror 4L) on a side where the rear vehicle is present, for at least one second (see FIG. 3). As described above, by directing the driver's attention to the door mirror 4, it is possible to visually notify the presence of the rear vehicle and to prevent a collision.

Figure 4:
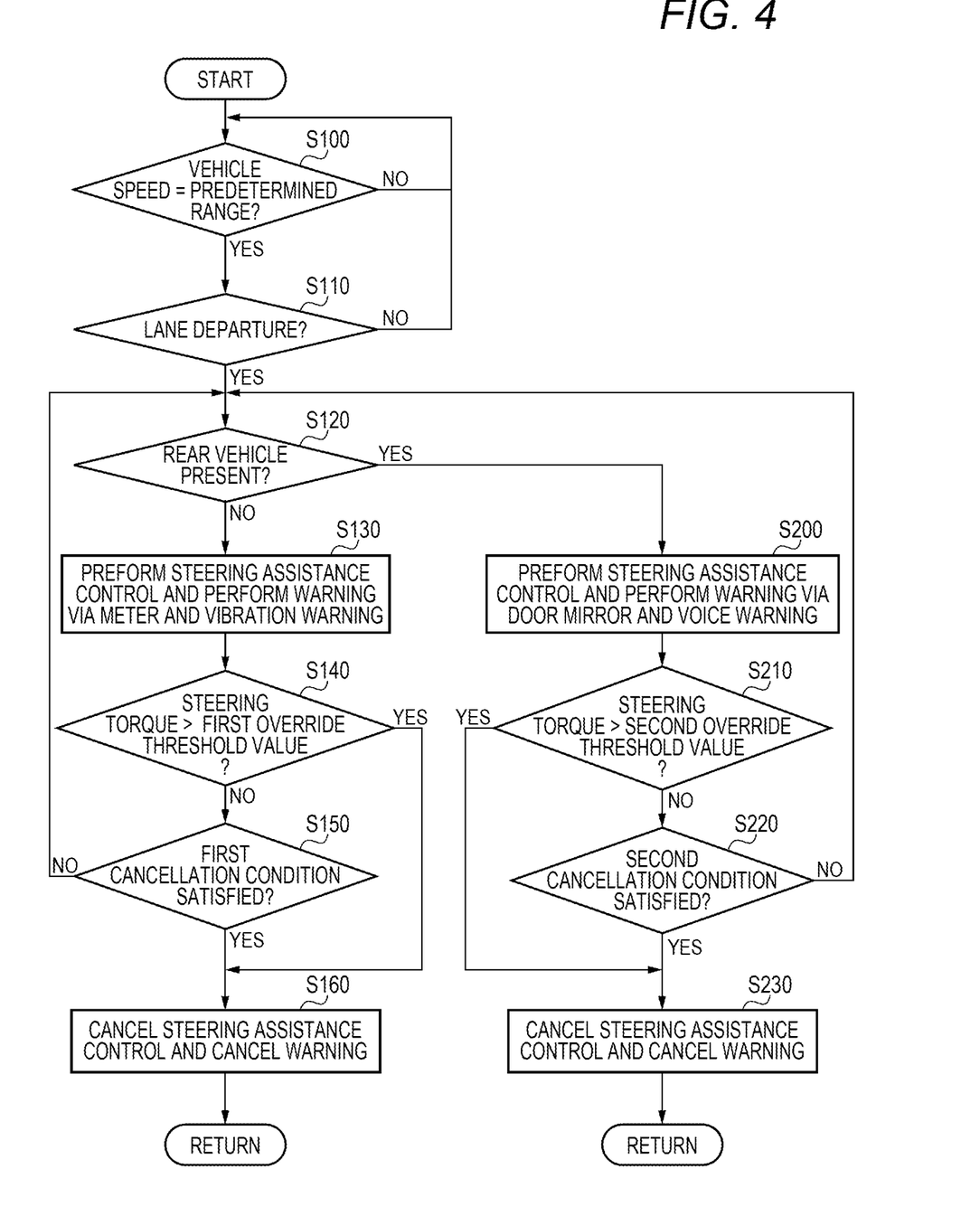
FIG. 4 is a chart illustrating a flow of processing of the steering assistance control and cancellation of the steering assistance control according to the present embodiment.

Next, a flow of processing of the steering assistance control and cancellation of the steering assistance control according to the present embodiment will be described with reference to a flowchart of FIG. 4. This control is started, for example, at the same time as a turning-on operation of an ignition switch.

First, in step S100, it is determined whether the vehicle speed is within a predetermined speed range, for example, 60 km to 130 km per hour. In a case where it is determined that the vehicle speed is not within the predetermined speed range (NO), the present control is returned. On the other hand, in a case where it is determined that the vehicle speed is within the predetermined speed range (YES), the control proceeds to step S110.

In step S110, it is determined whether the vehicle 1 departs from the traveling lane. In a case where it is determined that the vehicle 1 departs from the traveling lane (YES), the control proceeds to step S120. On the other hand, in a case where it is determined that the vehicle 1 does not depart from the traveling lane (NO), the present control is returned.

In step S120, it is determined whether a vehicle is present on the rear side of the vehicle 1. In a case where it is determined that the vehicle is present on the rear side of the vehicle 1 (YES), the control proceeds to step S200. In a case where it is determined that no vehicle is present on the rear side of the vehicle 1 (NO), the control proceeds to step S130.

In step S130, the steering assistance control is performed, and the optical warning and the vibration warning are performed via the meter display unit 5.

In step S140, it is determined whether the steering torque exceeds the first ovenide threshold value. In a case where the steering torque exceeds the first override threshold value (YES), the control proceeds to step S160. In a case where the steering torque does not exceed the first override threshold value (NO), the present control proceeds to step S150.

In step S150, it is determined whether the first cancellation condition is satisfied. In a case where the first cancellation condition is satisfied (YES), the control proceeds to step SI60. In a case where the first cancellation condition is not satisfied (NO), the control returns to step S120.

In step S160, the steering assistance control is cancelled, the warning is canceled, and this control is then returned.

As described above, in the case where it is determined in step S120 that the vehicle is present on the rear side of the vehicle 1 (YES), the control proceeds to step S200.

In step S200, the steering assistance control is performed, and an optical warning and a voice warning are performed via the door mirror 4.

In step S210, it is determined whether the steering torque exceeds the second override threshold value. In a case where the steering torque exceeds the second override threshold value (YES), the control proceeds to step S230. In a case where the steering torque does not exceed the second override threshold value (NO), the present control proceeds to step S220.

In step S220, it is determined whether the second cancellation condition is satisfied. In a case where the second cancellation condition is satisfied (YES), the control proceeds to step S230. In a case where the second cancellation condition is not satisfied (NO), the control returns to step S120.

In step S230, the steering assistance control is cancelled, the warning is canceled, and this control is then returned.

The present disclosure is not limited to the above-described embodiment, and can be appropriately modified and implemented without departing from the gist of the present disclosure.

The present application is based on a Japanese patent application (Japanese Patent Application No. 2020-007127) filed on Jan. 20, 2020, and the contents thereof are incorporated herein as reference.

INDUSTRIAL APPLICABILITY

The control device for a lane departure prevention device according to the present disclosure is useful in that the driver's intension can be effectively reflected while effectively reducing a risk of collision.

REFERENCE SIGNS LIST

1 vehicle
4L and 4R door mirror
5 meter display unit
10 engine
20 steering device
21 steering wheel
25 steering motor
65L and 65R rear side millimeter wave radar
71 front camera
100 control device
110 rear vehicle determination unit
120 traveling state acquisition unit
130 departure determination unit (lane departure detection unit)
140 lane change start determination unit (lane change start detection unit)
150 lane change end determination unit (lane change end detection unit)
160 steering assistance control unit
170 first assistive steering torque cancellation unit (assistive steering torque cancellation unit)
180 second assistive steering torque cancellation unit (assistive steering torque cancellation unit)
190 warning processing unit

The invention claimed is:

1. A control device for a lane departure prevention device comprising:
a lane departure detection unit configured to detect lane departure of a vehicle from a traveling lane;
a rear vehicle determination unit configured to determine whether a rear vehicle is present on a rear side of the vehicle;
a lane change start detection unit configured to detect start of a lane change of the vehicle from the traveling lane;
a lane change end detection unit configured to detect end of the lane change of the vehicle from the traveling lane;
a steering assistance control unit configured to, in a case where the lane departure is detected, apply an assistive steering torque to a steering wheel for a predetermined period in a direction opposite from a lane departure direction so that the vehicle maintains the traveling lane; and
an assistive steering torque cancellation unit configured to, in a case where the lane change start detection unit detects the start of the lane change and the rear vehicle determination unit determines that no rear vehicle is present, cancel application of the assistive steering torque, and in a case where the lane change end detection unit detects the end of the lane change and the rear vehicle determination unit determines that a rear vehicle is present, cancel the application of the assistive steering torque.

2. The control device for a lane departure prevention device according to claim 1,
wherein the assistive steering torque cancellation unit cancels the application of the assistive steering torque in a case where elapsed time from start of the application of the assistive steering torque reaches a predetermined upper limit threshold time.

3. The control device for a lane departure prevention device according to claim 1,
wherein the assistive steering torque cancellation unit cancels the application of the assistive steering torque in a case where a torque of an steering operation by a driver exceeds a predetermined first torque threshold value in the case where the rear vehicle determination unit determines that no rear vehicle is present, and cancels the application of the assistive steering torque in a case where the torque of the steering operation by the driver exceeds a predetermined second torque threshold value larger than the first torque threshold value in a case where the rear vehicle determination unit determines that a rear vehicle is present.

4. The control device for a lane departure prevention device according to claim 2,
wherein the assistive steering torque cancellation unit cancels the application of the assistive steering torque in a case where a torque of an steering operation by a driver exceeds a predetermined first torque threshold value in the case where the rear vehicle determination unit determines that no rear vehicle is present, and cancels the application of the assistive steering torque in a case where the torque of the steering operation by the driver exceeds a predetermined second torque threshold value larger than the first torque threshold value in a case where the rear vehicle determination unit determines that a rear vehicle is present.

5. A control method for a lane departure prevention device comprising:
detecting lane departure of a vehicle from a traveling lane;
determining whether a rear vehicle is present on a rear side of the vehicle;
detecting start of a lane change of the vehicle from the traveling lane;
detecting end of the lane change of the vehicle from the traveling lane;
in a case where the lane departure is detected, applying an assistive steering torque to a steering wheel for a predetermined period in a direction opposite from a lane departure direction so that the vehicle maintains the traveling lane; and
in a case where the start of the lane change is detected and it is determined that no rear vehicle is present, cancelling application of the assistive steering torque, and in a case where the end of the lane change is detected and it is determined that a rear vehicle is present, cancelling the application of the assistive steering torque.

* * * * *